(12) United States Patent
Steinhart et al.

(10) Patent No.: US 8,164,426 B1
(45) Date of Patent: Apr. 24, 2012

(54) SYSTEM AND METHOD FOR PRODUCING AND DISTRIBUTING DIGITAL IMAGES INCLUDING DATA IDENTIFYING SUBJECTS BEING PHOTOGRAPHED

(76) Inventors: Chanan Steinhart, Palo Alto, CA (US); Yishai Steinhart, Palo Alto, CA (US)

( * ) Notice: Subject to any disclaimer, the term of this patent is extended or adjusted under 35 U.S.C. 154(b) by 537 days.

(21) Appl. No.: 12/384,297

(22) Filed: Apr. 1, 2009

Related U.S. Application Data

(60) Provisional application No. 61/123,431, filed on Apr. 9, 2008.

(51) Int. Cl.
*H04Q 5/22* (2006.01)
*H04N 5/232* (2006.01)
(52) U.S. Cl. .................. 340/10.4; 348/211.9; 340/10.42
(58) Field of Classification Search ........................ None
See application file for complete search history.

(56) References Cited

U.S. PATENT DOCUMENTS

| | | | |
|---|---|---|---|
| 6,337,951 B1 * | 1/2002 | Nakamura | 396/57 |
| 6,950,800 B1 * | 9/2005 | McIntyre et al. | 705/1.1 |
| 2004/0135902 A1 * | 7/2004 | Steensma | 348/231.99 |
| 2006/0158533 A1 * | 7/2006 | Brahmbhatt et al. | 348/231.2 |

* cited by examiner

*Primary Examiner* — Daniel Wu
*Assistant Examiner* — John Bamert
(74) *Attorney, Agent, or Firm* — Norman Friedland

(57) ABSTRACT

A system and method is provided for taking digital photographs of subjects and for distributing digital images from the photographs according to subject identifiers transmitted from RFID tags held with the subjects. With a first embodiment, data from photographs taken of a number of groups of individuals, such as passengers on a cruise ship, are distributed only to individuals within the groups. With a second embodiment, the RFID tags are placed within or on objects likely to be stolen, so that the objects can be tracked by digital photographs automatically taken as the objects are moved past a camera unit.

17 Claims, 8 Drawing Sheets

SYSTEM AND METHOD FOR PRODUCING AND DISTRIBUTING DIGITAL IMAGES INCLUDING DATA IDENTIFYING SUBJECTS BEING PHOTOGRAPHED

RELATED APPLICATIONS

This application claims the benefit of Provisional Patent Application No. 61/123,431, filed Apr. 9, 2008.

FEDERALLY SPONSORED RESEARCH OR DEVELOPMENT

Not Applicable

BACKGROUND OF THE INVENTION

1. Field of the Invention

This invention relates to a system and method for producing digital images including metadata identifying subjects within the images and for subsequently distributing the images according to the metadata.

2. Summary of the Background Information

Conventional file formats for storing digital photographic images include, for each image, an image data section, in which the data used to develop pixels to be displayed or printed is stored, and a metadata section, in which digital data describing the camera or other device producing the image and the camera settings used to form the image. Thus, information automatically recorded in the metadata section can be used to reconstruct the conditions under which an image was taken. In addition, provisions are made to use data from the metadata section to facilitate locating individual images, with GPS coordinates being recorded by GPS-enabled cameras, so that images taken at a number of different locations can readily be searched, and with other locations within the metadata being provided for adding keywords using a file organization program such as Adobe® Bridge. What is needed is an effective method for allowing all photographs taken of a particular subject or individual to be accessed by searching digital photographic files for information stored within the metadata of individual images, allowing individual images to be located using conventional programs, such as Adobe Bridge.

Radio-Frequency Identification (RFID) is being increasingly used to identify subjects by means of tags emitting radio-frequency signals that are received by an interrogator that decodes the signals to form serial numbers associated with the subjects. For example, a number of turnpike authorities issue RFID tags that allow vehicles to which the tags are attached to drive past toll stations without stopping, with fees for the tolls being deducted from individual accounts associated with the tags. Since 1994, railroad freight cars in interchange service in North America have been equipped with Automatic Equipment Identification (AEI) tags, which transmit data identifying each car to a trackside RFID interrogator.

An RFID tag may be passive, with all of the energy needed for operation of the tag being drawn from an RF signal broadcast by the interrogator, or active, with the tag including a battery to provide the energy needed for operation. Additionally the tag may be semi-passive, with energy from a battery being used to power certain logical functions, while energy from the RF signal broadcast by the interrogator being used to power communications from the tag to the interrogator.

U.S. Pat. App. Pub. No. 2004/0201738A1 describes a system in which digital cameras are arranged at points of interest in a recreational venue to automatically photograph individuals participating in activities at such points in response to detection of identifying parameters uniquely to corresponding to respective individuals, such as respective radio frequency identification (RFID) tag code. The photographs are automatically transmitted for storage in a database from which they may be accessed for viewing or printing upon presentation and recognition of the identifying parameter. What is needed is a system allowing a photographer to arrange individuals for individual and group portraits, with the tag code information being made available for subsequent use in distributing photographic image data.

The complexity of an RFID system may be increased by needs to provide singulation and anti-collision capabilities in situations where multiple tags are expected to attempt to communicate with a single interrogator at once. Singulation, which provides for such communication in a serial, one at a time, basis, may be provided by the geometry of the area in which the interrogator operates. For example, automobiles proceeding by a toll station in a single lane at which an interrogator is aimed and railroad cars moving by a trackside interrogator naturally pass by the interrogator and communicate with it one at a time. U.S. Pat. App. Pub. No. 2004/0201738A1 describes a situation in which a number of skiers pass individually by an interrogator in a ski-lift line before a group portrait is taken, with individually recognized data being used to identify the individuals in the portrait. However, what is needed is a photographic system using an anti-collision procedure to allow people or subjects to be posed for a group portrait without requiring that the first pass single-file through a line to be individually identified. Such an anti-collision procedure would provide for the transmission of data from a number of tags in a sequential or otherwise multiplexed manner, so that the each of the RFID tags can individually communicate with the interrogator.

Many RFID systems are designed to identify an individual subject within a large number of similar subjects, with sufficient bits being provided within the data transmitted from the tag to identify, for example, any automobile within a state, or any freight car within North America. On the other hand, widely-used anti-theft systems use single-bit RFID tags that transmit data only indicating when an subject to which a tag is attached is within range of an interrogator. In this way, interrogators placed at each exit from a store are used to detect an attempt to remove an item having a tag that has not been deactivated from the store. What is needed is an anti-theft system having a capability of recognizing individual subjects within a number of similar subjects, with such a system providing information identifying a particular stolen subject.

SUMMARY OF THE INVENTION

In accordance with one aspect of the invention, a method for producing and distributing digital images is provided, comprising:

a) distributing a first plurality of RFID tags, each transmitting a different subject identifier in response to receiving an interrogation signal, b) arranging each of the RFID tags to be held with a subject;

c) transmitting the interrogation signal from a camera system;

d) receiving, within the camera system, a response including the different subject identifier from each RFID tag within a second plurality of RFID tags, wherein the second plurality is within the first plurality;

e) taking a digital photograph of a plurality of subjects, each holding an RFID tag within the second plurality;

f) recording data identifying each of the subject identifiers received in step d) within metadata stored with image data of the digital photograph taken in step e) as a data file;

g) repeating steps c) through f) a plurality of times to store a plurality of data files;

h) downloading the plurality of data files to an image server computer system;

i) receiving a request over a network from a client system for digital images of a subject identified by a subject identifier of an RFID tag within the first plurality held by the subject;

j) locating one or more data files including the subject identifier within the request received in step h); and k) transmitting the one or more data files located in step i) over the network to the client system.

Transmission of the interrogation signal may be begun by a photographer, with the digital photograph additionally being taken by the photographer. Preferably, a timer is started when the interrogation signal is begun, with the transmission of the interrogation signal being ended with the expiration of the timer, and with an indicator light being illuminated only during the transmission of the interrogation signal. This method may be used to sort a large number of digital photographs so that only digital photographs including an individual subject are sent to the individual subject at his request.

Alternately, the digital photograph may be taken automatically (without a photographer) in response to receiving a first response signal from an RFID tag within the first plurality thereof, with a number of RFID responses in the second plurality thereof being limited by expiration of a timer set in response to receiving the first response signal. This method may be used to track a stolen article holding the RFID tag.

In accordance with another aspect of the invention, a method for tracking a stolen article is provided, comprising:

a) distributing a first plurality of RFID tags, each transmitting a different subject identifier in response to receiving an interrogation signal, b) arranging each of the RFID tags to be held with a subject;

c) transmitting the interrogation signal from a camera system;

d) receiving, within the camera system, a response including a subject identifier from an RFID tag within the first plurality of RFID tags, e) taking a digital photograph of a subject holding the RFID tag from which the response was received;

f) recording data identifying the subject identifier received in step d) within metadata stored with image data of the digital photograph taken in step e) as a data file;

g) repeating steps d) through f) a plurality of times to store a plurality of data files;

h) receiving a request over a network from a client system for digital images of the stolen article identified as a subject identified by a subject identifier of an RFID tag within the first plurality held by the subject;

i) locating one or more data files including the subject identifier within the request received in step h); and j) transmitting the one or more data files located in step i) over the network to the client system.

The subject identifier received in step d) may be stored in temporary data storage, and the digital photograph may additionally be taken in step e), only when the subject identifier has not previously been stored in temporary data storage during a time established by a timer. This method allows a photograph to be taken when a response is received while preventing thousands of digital photographs from being taken when an article holding one of the RFID tags is held within range of the interrogation signal.

Alternately, a timer may be started in response to receiving a response in step d), with an additional plurality of responses being received in step d), and data identifying each of the different subject identifiers being recorded in step f) within the metadata stored within the data file. This method allows a digital photograph to be taken with a number of identifiable subjects.

In accordance with yet another aspect of the invention, a camera system is provided comprising:

an image sensor producing an image data signal in response to being exposed to a pattern of illumination;

camera optics focusing an image of subjects within a field of view on the image sensor;

an RFID interrogator transmitting a radio-frequency interrogation signal, receiving a radio-frequency response signal including a subject identifier from an RFID tag receiving the interrogation signal; and producing an output signal including the subject identifier;

a digital data generator receiving the image data signal from the image sensor and the output signal from the RFID interrogator and forming a digital data file including an image data section derived from the image data signal from the image sensor and a metadata section including the subject identifier derived from the output signal from the RFID interrogator; and data file storage receiving and storing the image digital data file from the digital data generator.

Preferably, the metadata section includes an Exif section storing data identifying a type of camera used to produce the digital data file, with the subject identifier being stored within the Exif section or in an area located by a pointer stored within the Exif section.

BRIEF DESCRIPTION OF THE DRAWINGS

Embodiments implementing the invention will now be described with reference to the accompanying drawings, in which.

DETAILED DESCRIPTION OF THE INVENTION

Figure 1:
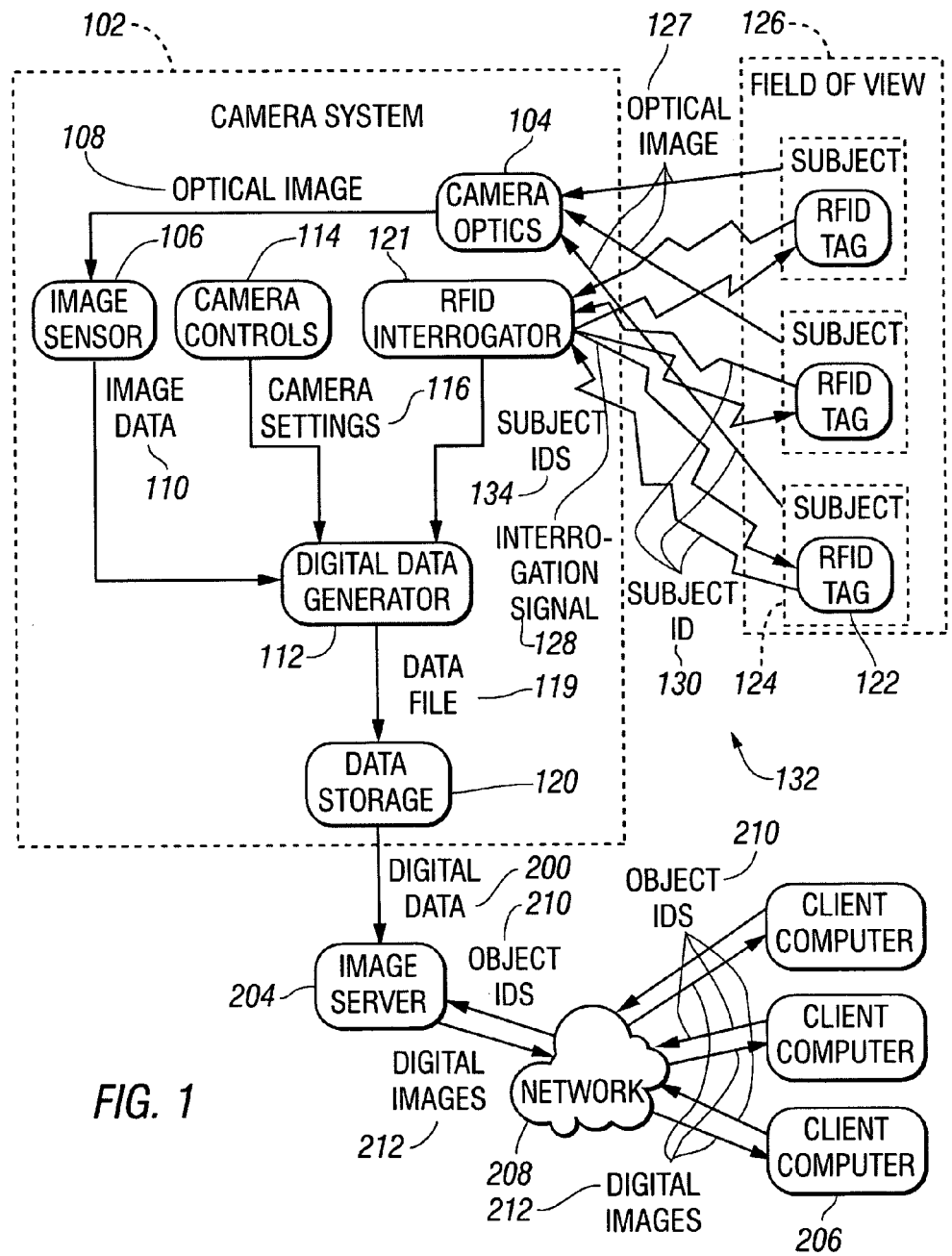
FIG. 1 is a block diagram of a system for producing and distributing digital photographic images in accordance with the invention.

FIG. 1 is a block diagram of a system 100 for producing and distributing digital photographic images in accordance with the invention, including a camera system 102, which may be a single unit or a number of units interconnected to communicate with one another by wired or wireless means. The camera system 102 includes conventional digital camera systems, such as camera optics 104 and an image sensor 106 receiving optical images 108 from the camera optics 104 and transmitting image data 110 in the form of electrical signals to a digital data generator 112 when a digital photograph is taken. Camera controls 114 are used, for example, to set the magnification of a zoom lens within the camera optics, to set the lens aperture and shutter time values, and to release the shutter. When a digital photograph is taken, data 116 describing the camera setting is additionally sent to the digital data generator 112, to be stored as metadata, along with the image data 110 as a data file 119 within data storage 120.

To provide capabilities particularly associated with the present invention, the camera system 102 additionally includes an RFID interrogator 121 (otherwise known as a reader), which receives signals from RFID tags 122 (otherwise known as transponders), each of which is attached to, or otherwise held with, a photographic subject 124 within the field of view 126 of the camera optics 104, from which optical images 127 are transmitted through the camera optics 104. (The term "subject" as used herein is meant to include animate as well as inanimate subjects.) The RFID interrogator 121 transmits a interrogation signal 128, preferably covering the filed of view 126, which causes each of the RFID tags 122 to return to the RFID interrogator 121 an RF signal including data 130 identifying the subject 124 associated with the RFID tag 122. Preferably, an RFID system 132 including the RFID interrogator 121 and the RFID tags 122 has anti-collision capabilities allowing the RFID tags 122 to communicate with the RFID interrogator 121 on an individual basis. For each digital photograph being taken of a number of subjects 124, data 134 describing each of the subjects 124 is transmitted from the RFID interrogator 121 to the digital data generator 112 to be combined into the metadata 118, which is in turn combined with the image data 110 to form a data structure 119 stored in data storage 120 within the camera system 102.

Figures 2, 3:
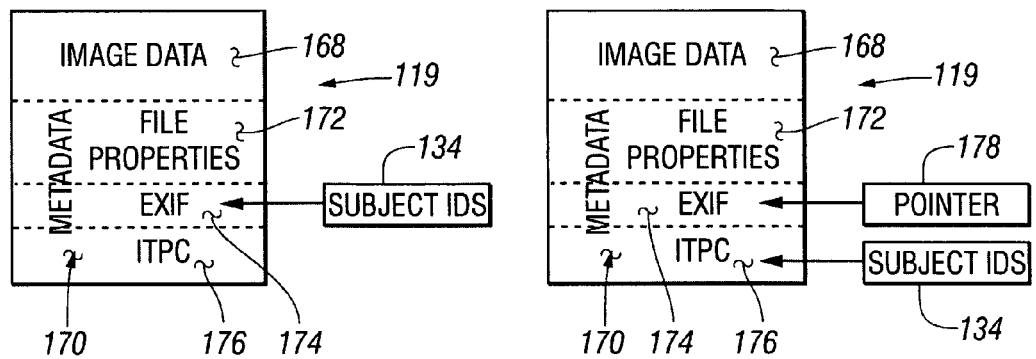
FIG. 2 is a pictographic view of a first version of a data structure generated within the system of FIG. 1.
FIG. 3 is a pictographic view of a second version of a data structure generated within the system of FIG. 1.

FIG. 2 is a pictographic view of a first version the data structure 119, showing a data section 168 provided for storing image data and a data section 170 provided for storing non-image metadata. Conventional metadata, which is embedded within digital image files, is used to provide non-image data describing each digital image. For example, conventional metadata includes data automatically generated during the process of creating the digital image file, such as data describing the file properties of the image data, stored within a first portion 172 of the metadata section 170, and data, stored within the second portion 174 of the metadata section 170, describing the input device, such as a digital camera or scanner, producing the original data. This input device data is filed according to an Exif (Exchangeable Image File Format) specification, which has been developed to provide digital camera manufacturers with a place to store data identifying the type of camera or other device used to produce the image, the camera settings, and the date and time a digital photograph was taken. The conventional metadata also includes ITPC (International Press Telecommunications Council) metadata, stored within a third portion 176 of the metadata section 170, which can be edited by the user to describe information useful in describing images to be sold, such a copyright data, conditions of use, keywords associated with the image, and a caption for the image. The conventional metadata can also be extended according to the XMP (eXtensible Metadata Platform) standard. For example, as shown in FIG. 2, the subject identifiers 134 transmitted to the digital data generator 112 are embedded within the portion 174 of the metadata section 170, which is conventionally reserved, or otherwise used, for storing Exif information, with certain of the metadata tags provided for storing Exif information being used to store the subject identifiers 134, without adding additional metadata tags.

FIG. 3 is a pictographic view of a second version of the data structure 119, indicated as data structure 119', in which a pointer 178 is stored within a location within the area 172 reserved for Exif data, with the pointer 178 defining a location elsewhere in which the subject identifiers 134 are stored. This method has an advantage of providing greater storage area for the subject identifiers 134 in the event that large groups of subjects 134 are to be photographed. The methods of FIGS. 2 and 3 may both be employed in the same cameral subsystem 102, with the method of FIG. 2 being employed only when the space required for storing subject identifiers 134 exceeds the space available within the area 172.

Referring again to FIG. 1, after the digital data 119 corresponding to a number of digital photographs is accumulated within the data storage 120 of the camera system 102, the accumulated digital data 200 is downloaded from the camera system 102 to a computer system acting as an image server 204. For example, downloading may be done through a cable connection, such as a USB connection or, if the data storage 120 is a removable storage medium, by removing the data storage 120 and placing it in a receptacle having contacts connected to the image server 204. One or more levels of intermediate storage (not shown) may additionally be used, providing storage capacity greater than the camera system data storage 120 and providing for the combination of data from a number of camera systems 102 before the data is loaded into the image server.

The subject identifiers 134 within the metadata of the digital data 119 of individual digital photographs remain in place within the digital data 200 stored within the image server 204, allowing the digital data 119 of individual digital photographs to be accessed within the image server 204 by using the subject identifiers 134 of the digital data 119.

The image server 204 is connected to a number of client computers 206 through a network 208, such as the Internet, allowing the client computers 206 to provide subject identifiers 210 corresponding to digital photographs which are selected. Then, in response to receiving the subject identifiers 210, the image server 204 transmits the digital data 212 of the selected digital photographs to the client computer 206 in which the selection was made.

Figure 4:
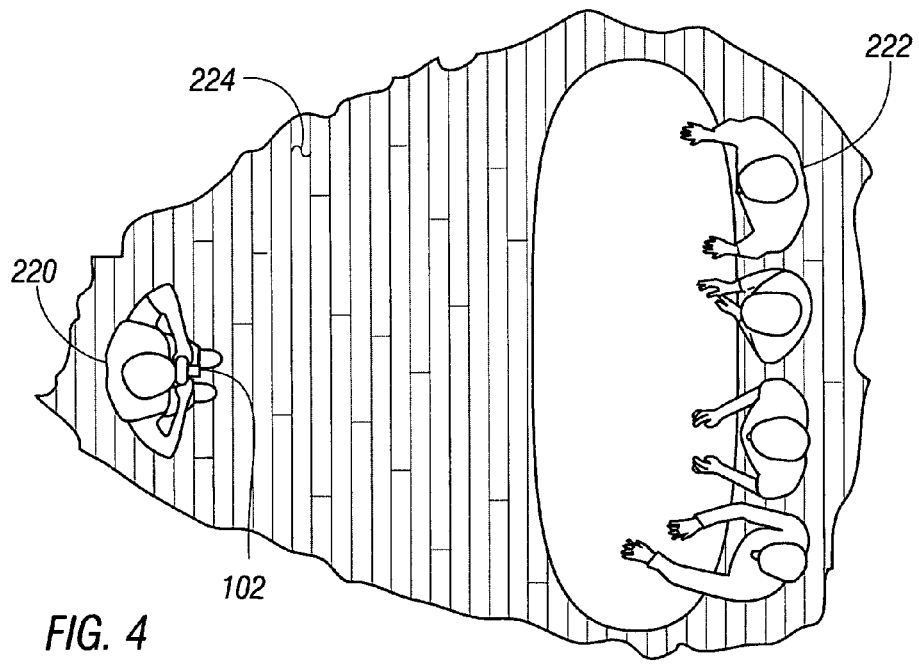
FIG. 4 is a plan view of a digital photograph being taken with the system of FIG. 1 in accordance with a first embodiment of the invention.

FIG. 4 is a plan view of a digital photograph being taken in accordance with a first embodiment of the invention, which is configured to allow a professional photographer to take digital photographs of individuals, in group or individual settings, and subsequently to provide galleries for each of the individuals containing representations of all the digital photographs including the individual but none of the other digital photographs that may be taken during the time period. For example, the photographer 220 has a contract to take digital photographs of passengers 222 on a cruise ship 224. During boarding, each of the passengers 222 is given an RFID tag 122 (shown in FIG. 1) to carry throughout the journey. When a digital photograph is taken, the camera system 102 records subject identifiers 134 (shown in FIG. 1) of each of the passengers 222.

Figure 5:
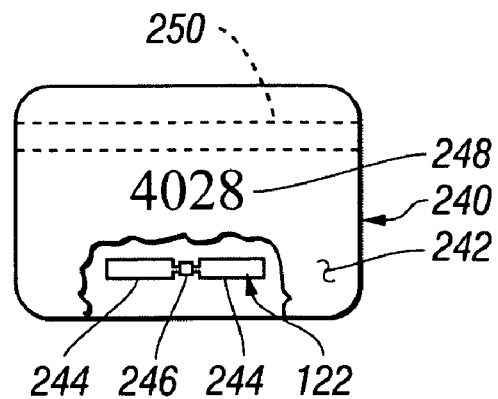
FIG. 5 is a plan view of a card including an embedded RFID tag used within the system of FIG. 1.

FIG. 5 is a plan view of an RFID tag carrying card 240 including an embedded RFID tag 122 configured for use with a system built in accordance with the first embodiment of the invention in an exemplary configuration providing backscatter coupling with the RFID interrogator 121 (shown in FIG. 1). The card 240 is shown with an upper layer 242 partially peeled away to reveal basic structures of an exemplary RFID tag 122, which comprise a pair of antenna sections 244 electrically connected by a circuit chip 246. When the interrogation signal 128 of the RFID interrogator 121 is directed at the antenna sections 244, the antenna sections 244 reflect the interrogation signal 128 back to the interrogator 121. When the antenna sections 244 are electrically connected by the circuit chip 246, the antenna efficiently reflects the radio frequency interrogation signal 128. When the antenna sections 244 are not electrically connected by the circuit chip 246, the interrogation signal 128 is less efficiently reflected, so that the RFID interrogator 121 receives the reflected signal as including a series of pulses, which are arranged by switching within the circuit chip 246 in a pattern representing the subject identifier 130 associated with the RFID tag 122. Alternately, the antenna sections 244 may be connected to a resistance that is varied to produce the pulse pattern. Some of the energy received from the interrogation signal 128 is used to power operations within the circuit chip 246, allowing the RFID tag 122 to operate as a passive device, without a battery.

Preferably, the card 240 is the size and shape of a common credit card, so that it can be easily carried by the passengers 222, with communications occurring between the embedded RFID tag 122 and the RFID interrogator 121 even when the card 240 is within a wallet in a pocket or purse. The card 240 also includes the subject identifier corresponding to the RFID tag 122 in a human-readable form 248, providing data that can be subsequently used to select a gallery of images from photographs of the passenger 222 having the card 240. The card 240 may additionally include, on its reverse side, a conventional magnetic stripe 250, which may be encoded to be used to receive complementary items or to purchase items.

Figure 6:
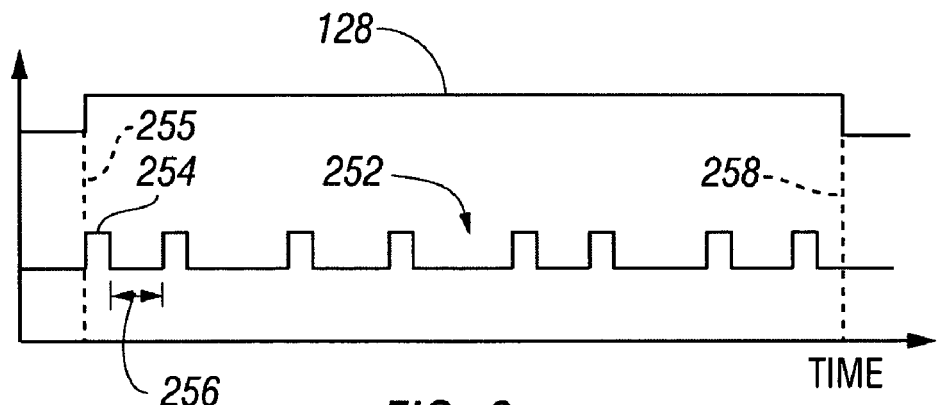
FIG. 6 is a graphical view of a interrogation signal transmitted by an RFID interrogator within the system of FIG. 1, together with a signal generated by an RFID tag in the system of FIG. 1, in response to receiving the interrogation signal.

FIG. 6 is a graphical view of the interrogation signal 128 transmitted by the RFID interrogator 121 and of a radio-frequency signal 252 transmitted by one of the RFID tags 122 in response to receiving the radio-frequency signal 251. For example, the interrogation signal 128 is transmitted whenever the RFID interrogator 121 is turned on to identify RFID tags 122. In response to receiving the radio-frequency signal 251, each of the RFID tags 122 transmits a number of messages 254, with each of the messages 254 being transmitted in the form of a pulse train modifying a radio-frequency signal, with individual pulses within the pulse train being modified to transmit data comprising the subject identifier 130 of the RFID tag 122. With backscatter coupling between the RFID interrogator 121 and the RFID tags 122, as described above in reference to FIG. 5, the radio-frequency signal transmitted by the RFID tag 122 is a reflection of the radio-frequency signal 251 transmitted by the RFID interrogator 121, with the pulses being formed by the operation of the chip 246.

Preferably, the RFID system 132 operates in a manner providing an anti-collision feature, allowing a number of the tags 122 to communicate with the interrogator 121 while preventing the effect of messages "colliding" or interfering with one another. For example, an RFID technique generally known as "aloha" may be used. With aloha, each of the RFID tags 122 transmits a message 254 upon initially receiving the interrogation signal 128 at a time 255. Since this may cause many RFID tags 122 to transmit information at the same time, so that the RFID interrogator 121 cannot interpret the information transmitted at this time. However, each of the tags 122 then waits a time period 256 before transmitting another message 254, and then repeats the process of waiting and retransmitting, with the time periods 256 being random in duration, so that, eventually, all of the tags 122 within range of the interrogation signal 128 can communicate successfully with the interrogator 121 before transmission of the interrogation signal 128 is ended at a time 258.

While the above description in reference to FIG. 6 has been given with some degree of particularity, it is understood that this discussion has been given only as an example of a method providing an anti-collision capability allowing a number of RFID tags 122 concurrently in proximity to the RFID interrogator 121 to individually communicate with the interrogator 121. Other methods for providing an anti-collision capability, which are well known to those skilled in the art of designing and implementing RFID systems, may be alternately used within the RFID system 132.

The aloha anti-collision method described above is an example of a probabilistic method, in which the RFID tags 122 respond at random times until all of the RFID tags 122 in range have responded in a time period free of interference from the responses of other RFID tags 122. A disadvantage of this method is that, as the number of RFID tags 122 increases, the time required to receive all the responses increases dramatically. At the expense of some additional complexity, an anti-collision method known as "slotted aloha" may be used within the RFID system 132, with the interrogation signal 128 being modulated to provide various commands, with the RFID tags 122 choosing among a number of delay times, or "slots," following a command from the RFID interrogator 121, in which to provide a response. Then, when a clear response from an RFID tag 122 has been received, the RFID interrogator 121 transmits a code identifying the particular RFID tag 122, which then enters a dormant state for a predetermined time, allowing the other RFID tags 122 more chances to respond. Alternately, the RFID system 132 may employ a deterministic anti-collision method, in which a program running in the RFID interrogator 121 asks for RFID tags having particular bit patterns within their subject identifiers 130 to respond until all of the bit patterns of all of the RFID tags have been established.

Figure 7:
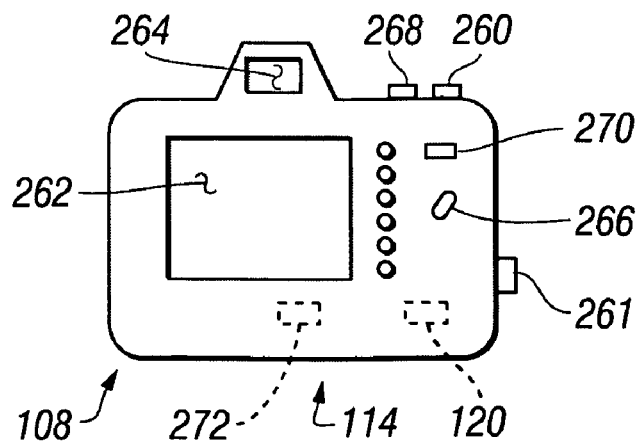
FIG. 7 is a rear elevation of a camera system shown in the plan view of FIG. 4.

FIG. 7 is a rear view of an exemplary version of the camera system 108, configured for operation according to the first embodiment of the invention. The camera system 108 includes a number of camera controls 114, including a switch-actuating shutter release button 260. The camera system 108 additionally includes a power switch 261, a display screen 262, a viewfinder 264, an ID (identification) mode switch 266, an ID start switch 268, and an ID processing indicator light 270. This arrangement allows the identification process associated with the RFID interrogator 121 to be initiated by depressing the ID start switch 268, with the ID mode switch 266 in a position providing for independent operation of the identification process, or by depressing the shutter release button 260, with the ID mode switch 266 in a second position not providing for such independent operation. In this way, the photographer 220 is provided with a degree of flexibility needed for various photographic shooting situations. In general, the time required to complete the identification process is a function of the number of individuals 222 in a group being photographed. For example, the photographer 220 may prefer the spontaneity of using only the shutter release button 260 when taking digital photographs of single individuals 222 or of small groups, with the identification process being completed easily during the photography. On the other hand, when photographing a large group, it may be desirable to start the identification process by depressing the ID start switch 268 while posing the individuals 222, so that a substantial time will be available for the identification process before the individuals 222 disburse. The ID processing indicator light 270 provides an indication that the identification process is occurring, so that the individuals are not dispersed before the identification process is completed. This indication may also be provided through the display of a symbol visible through the viewfinder 264. The camera system 108 additionally includes processing means 272, which may include a single microprocessor or multiple microprocessors operating together. temporary data storage 274, in which data describing the subject identifiers 130 of a particular group of subjects arranged for photography are accumulated, and file data storage 120 in which file data for each digital photograph, including image data and metadata, is stored.

Figure 8:
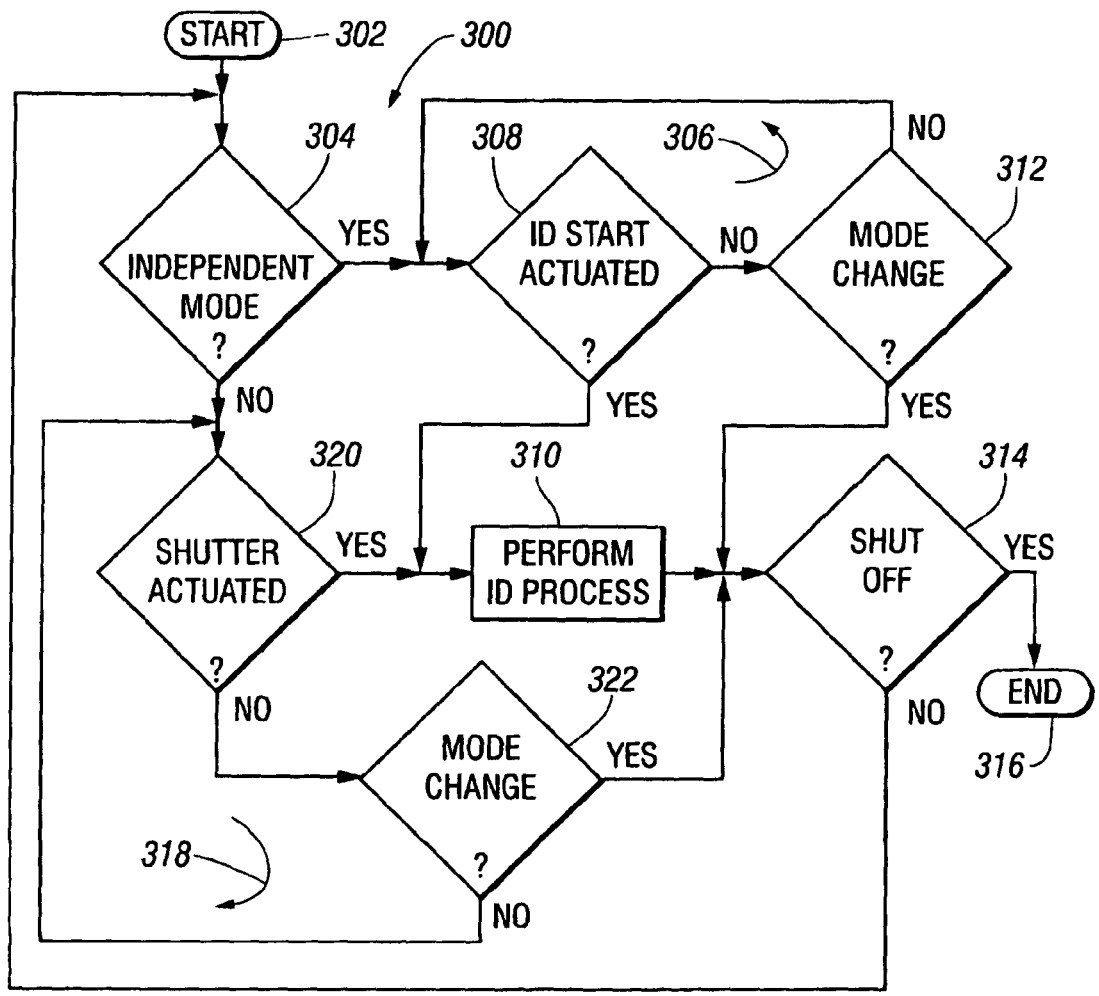
FIG. 8 is a flow chart of processes occurring during the execution of a routine within the camera system of FIG. 1 in accordance with the first embodiment of the invention.

FIG. 8 is a flow chart of processes occurring within the camera system 108 during execution of a routine 300 under control of the processing means 272 therein. After starting in step 302 in response to turning on the power switch 261, the routine 300 proceeds to step 304, in which a determination is made of whether the ID mode switch 266 is in the position providing for independent operation of the identification process associated with the RFID interrogator 121. If the ID mode switch 266 is set to provide for independent operation, the routine 300 enters a loop 306 waiting for either the ID start switch 268 to be depressed, or for a mode change to occur, indicating that the position of the ID mode switch 266 has been changed, or that the position of the power switch 261 has been changed. When it is determined in step 308 that the ID start switch 268 has been depressed to actuate the identification process, this process is performed in a subroutine 310. When it is determined in step 312 that a mode change has occurred, a further determination is made in step 314 of whether the power switch 261 has been shut off, causing the routine 300 to end in step 316. (It is assumed that electrical power is maintained to allow a process such as the identification process of step 310 to be completed, even after the power switch 261 is shut off.) If it is determined in step 314 that the power switch 261 has not been shut off, the routine 300 returns to step 304 to check the position of the ID mode switch 266.

If it is determined in step 304 that the ID mode switch is not set to provide for independent operation, the routine 300 enters a loop 318 to wait for the shutter release button 260 to be depressed, actuating a shutter mechanism within the camera system 108, or for a mode change, again indicating that the position of the ID mode switch 266 or of the power switch 261 has changed. If it is determined in step 320, that the shutter release button has been depressed, the identification process is performed in step 310. When it is determined in step 322 that a mode change has occurred, and additionally when the identification process of step 310 is completed, the routine 300 proceeds to step 314 to determine whether the power switch 261 has been shut off.

Figure 9:
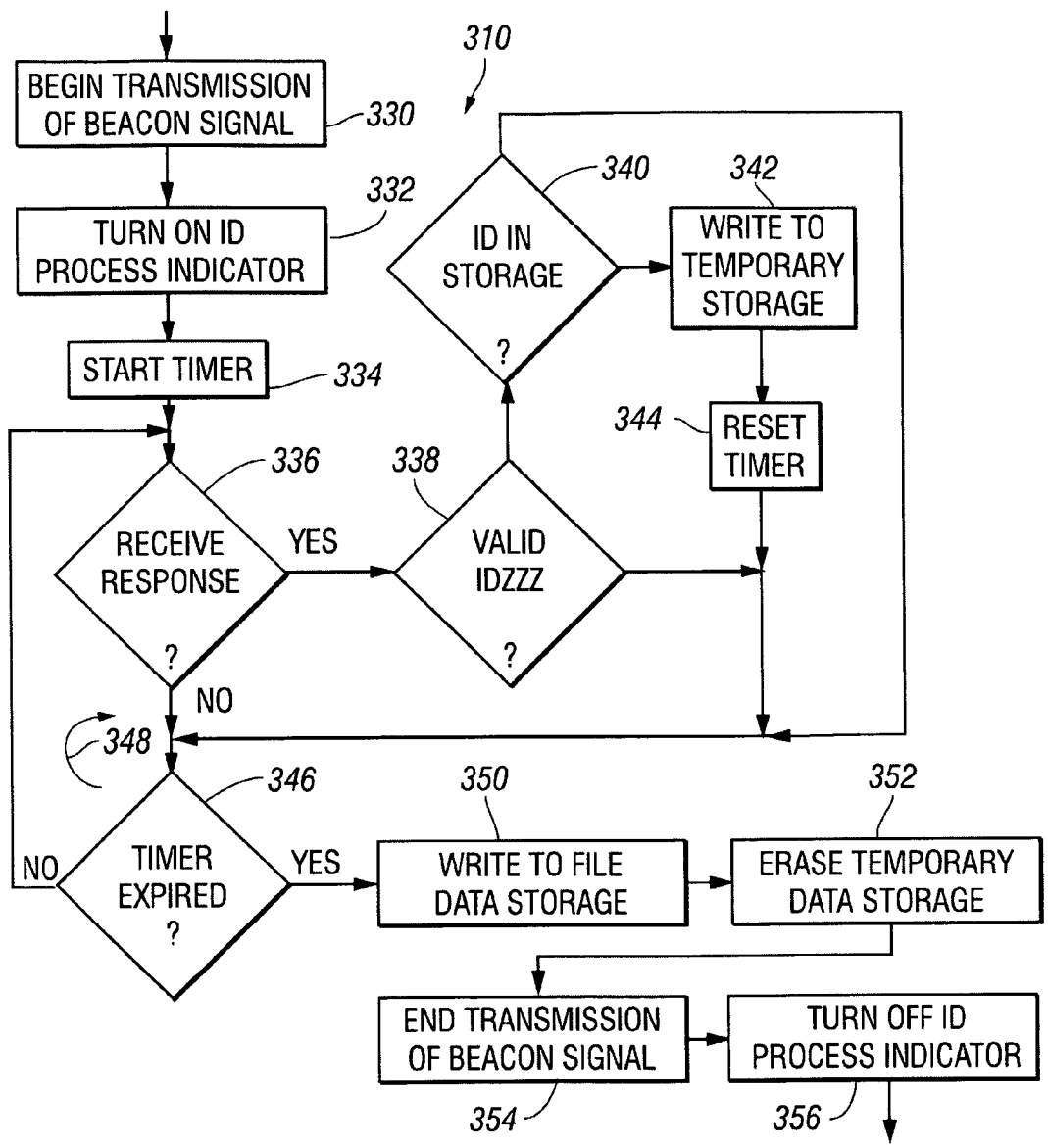
FIG. 9 is a flow chart of processes occurring during the execution of an identification process subroutine within the routine of FIG. 8.

FIG. 9 is a flow chart showing processes occurring during execution of the subroutine 310 forming a portion of the routine 300, discussed above in reference to FIG. 7. After starting in response to a determination, in step 308 of the routine 300, that the ID start switch 268 has been depressed, or in response to a determination, in step 320 of the routine 300, that the shutter release button 260 has been depressed, the subroutine 310 proceeds to step 330 to begin transmitting the interrogation signal 128 and to step 332 to turn on the ID processing indicator light 270, indicating to the photographer 220 that the identification process is occurring. Then, in step 334, a timer, which may be a timing circuit or a counting subroutine performing a timer function, is started.

When it is then determined in step 336 that a response has been received from one of the RFID tags 122, a further determination is made in step 338 of whether the response received in step 336 contains a valid description of an subject identifier 130 from an RFID tag 122. Often, a valid description of subject identifier 130 will not be received because two or more RFID tags 122 are transmitting at once. Various error detection, and, optionally, error correction techniques, well known to those skilled in the art of digital communication, may be employed in the determination of whether a valid serial number has been received. If a valid subject identifier 130 has been received, a further determination is made in step 340 of whether the subject identifier 130 has already been stored in temporary data storage 274 within the camera system 108, indicating that the subject identifier 130 has previously been communicated and stored for the particular digital photograph for which data is being collected. If the subject identifier 130 is not in temporary data storage 274, it is written thereto in step 342. In this way, the subject identifiers 130 transmitted by all of the responding RFID tags 122 are stored within temporary data storage 274, one at a time, with the timer started in step 334 being reset in step 344 after each of the subject identifiers 130 is stored in step 342. In this way, after each response having an subject identifier 130 that has not yet been stored, a predetermined time is provided to receive another response having an subject identifier that has not yet been restored. Thus: if it is determined in step 346 that the timer has not expired, the subroutine 310 enters a loop 348 to determine when a response is received or when the timer has expired.

When it is determined in step 346 that the timer has expired, i.e. that enough time has expired without receiving a response including an subject identifier 130 that has not previously been written to temporary data storage 274, the data from temporary data storage 272 is written to file data storage 120 in step 350, preferably as described above in reference to FIGS. 2 and 3. Then, in step 352, the data stored in temporary storage 272 is erased; in step 354, transmission of the interrogation signal 128 is ended, and, in step 356, the ID process indicator 270 is turned off, ending the processes of subroutine 310, with the routine 300 proceeding to step 314 as explained above in reference to FIG. 8.

Figure 10:
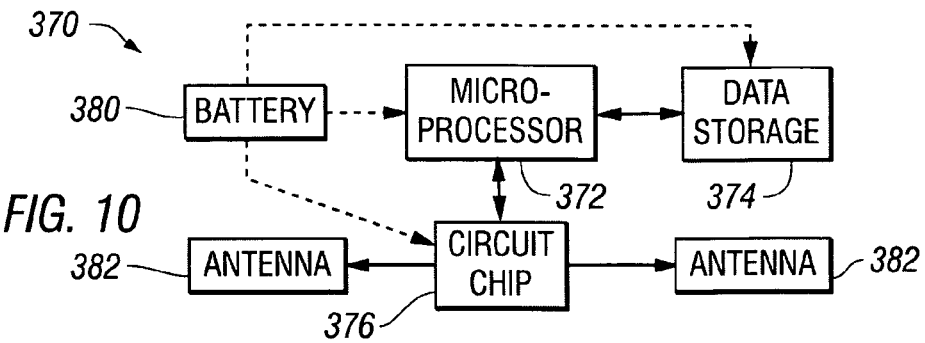
FIG. 10 is a block diagram showing a semi-passive RFID tag for alternative use within the system of FIG. 1.

FIG. 10 is a block diagram showing a semi-passive RFID tag 370, which can be used in place of the passive RFID tag 122 described above in reference to FIG. 5. The semi-passive RFID tag 370 includes a microprocessor 372 and data storage 374 storing instructions for a program executing within the microprocessor 372 in response to an interrogation signal 128. Electrical power for the microprocessor 372, the data storage 374, and a circuit chip 376 is derived from a battery 380. The circuit chip 376 provides data to the microprocessor 372, in response to receiving the interrogation signal 128 through the antenna sections 382, an varies an impedance attached to or between the antenna sections 382 so that a reflection of the interrogation signal 128 is modulated to form the subject identifier 130. Thus, while the battery 380 provides power to drive electronic logic within the semi-passive RFID tag 370, power for the actual transmission of data from the tag 370 is provided by the reflection of the interrogation signal 128.

Figure 11:
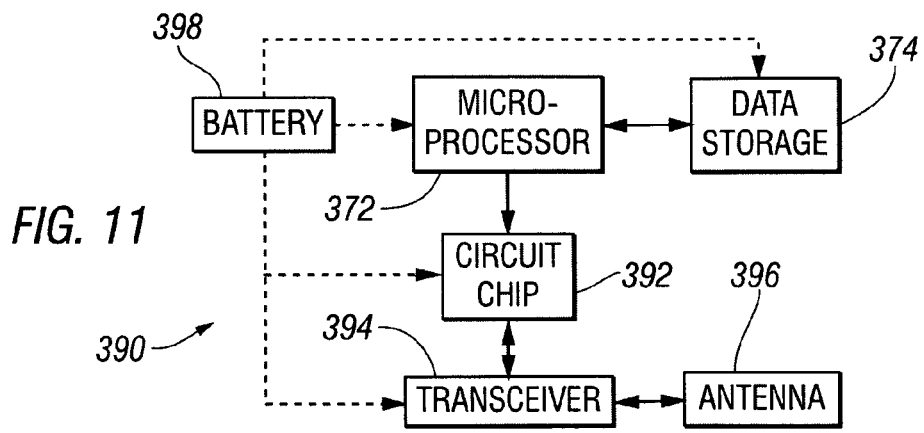
FIG. 11 is a block diagram showing an active RFID tag for alternative use within the system of FIG. 1.

FIG. 11 is a block diagram showing an active RFID tag 390, which can also be used in place of the passive RFID tag 122 described above in reference to FIG. 5. Like the semi-passive RFID tag 370, the active RFID tag 390 includes a microprocessor 372 and data storage 374, which, being similar to corresponding devices within the tag 370, are accorded similar reference numbers). Data storage 274 stores instructions for a program executing within the microprocessor 372 in response to an interrogation signal 128. The circuit chip 392 is connected to a transceiver 394, which is in turn connected to an antenna 396. The transceiver 394 operates in a receive mode, receiving a signal from the antenna 396, and in a transmit mode, driving the antenna 396 with a signal to be transmitted. The circuit chip 392 transmits signals in either direction between the microprocessor 372 and the transceiver 394, providing modifications to the signals as needed. Upon receiving an indication that an interrogation signal 128 has been received, a program executing within the microprocessor 372 causes the transceiver to switch to the transmit mode and to transmit a radio-frequency signal modulated to provide the subject identifier 130. The battery 398 provides electrical power for all the processes occurring within the active RFID tag 390.

Figure 12:
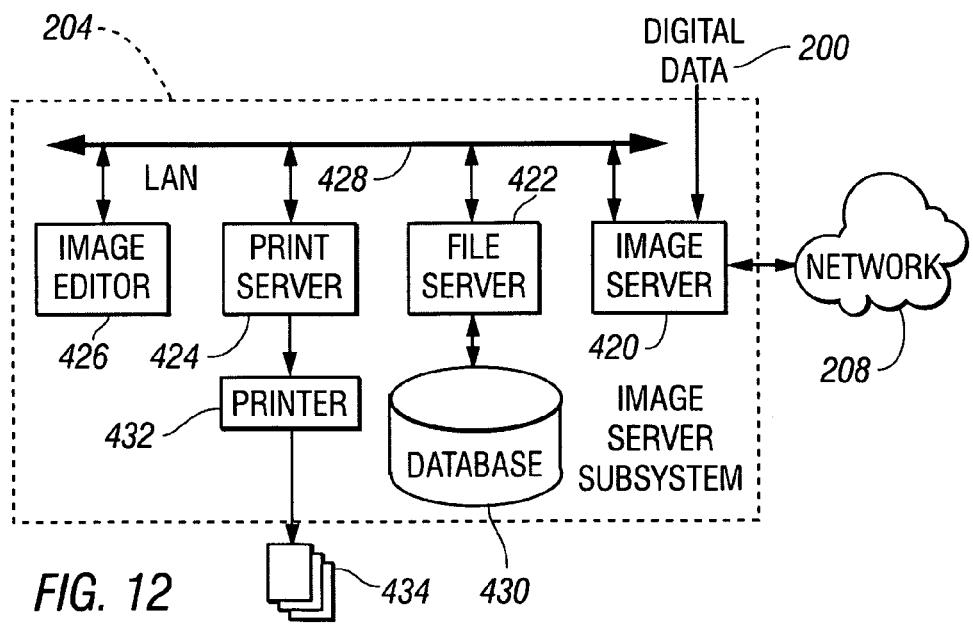
FIG. 12 is a block diagram showing an image server subsystem within the system of FIG. 1.

FIG. 12 is a block diagram showing an exemplary version of the image server subsystem 204, including an image server computer 420, a file server computer 422, a print server computer 424, and an image editor computer 426, all of which are interconnected by a LAN 428 (local area network). The image server computer 420 is connected to the network 208, providing access by the client computers 206, as described above in reference to FIG. 1. The file server computer 422 is connected to a database 430. Digital data 200 from the camera system 102 is downloaded into the image server computer 420, for example, through a cable attached to extend between the camera system 102 and the image server computer 420 or by transmitting the data over the network 208 or the LAN 428. The digital data 200 is then transmitted over the LAN 428 to the file server 411 to be stored within the database 430. This digital data 200 includes a plurality of data files 119, each of which can be located by means of one or more subject identifiers 130 stored within the metadata of the data file 119 (shown in FIG. 2).

A photographic subject 222 (shown in FIG. 4) wanting to see all of the images of digital photographs taken of him during a cruise on the ship 224 uses one of the client computers 206 to access the image server computer 420, providing a request for such images along with the human readable subject identifier 248 printed on his RFID card 240 (shown in FIG. 5). Upon receiving such a request over the network 208, a program executing within the image server computer system 420 selects all the data files 119 within the database 430 having a subject identifier 130 corresponding to the human readable subject identifier 248. For example, this method is used to locate 20 digital images including the photographic subject 222 among 3,000 digital images taken by the photographer 220 during the cruise on the ship 224. The program executing within the image computer system 420 then causes low-resolution images corresponding to the data files 119 selected using the subject identifier 130 to be sent to the client computer 206 over the network 208 in the form of a gallery for viewing and for further selections by the photographic subject 222.

These low-resolution images are then used by the photographic subject 222 through the client computer to select the associated data files 119 on which further operations are to be performed. For example, images from the selected data files 119 are transmitted to the print server 424 to be printed on a printer 432, with the resulting prints 434 being mailed to the photographic subject 222. Alternately, high resolution versions of the selected data files 119 may be transmitted over the network 208 for printing on a printer (not shown) accessed by the client computer 206. Various image editing services may also be provided by modifying copies of the selected data files 119 according to instructions provided from the client computer 206 over the network 208, with the modified data files then being transmitted over the network 208 or mailed as prints 434.

Figures 13, 14:
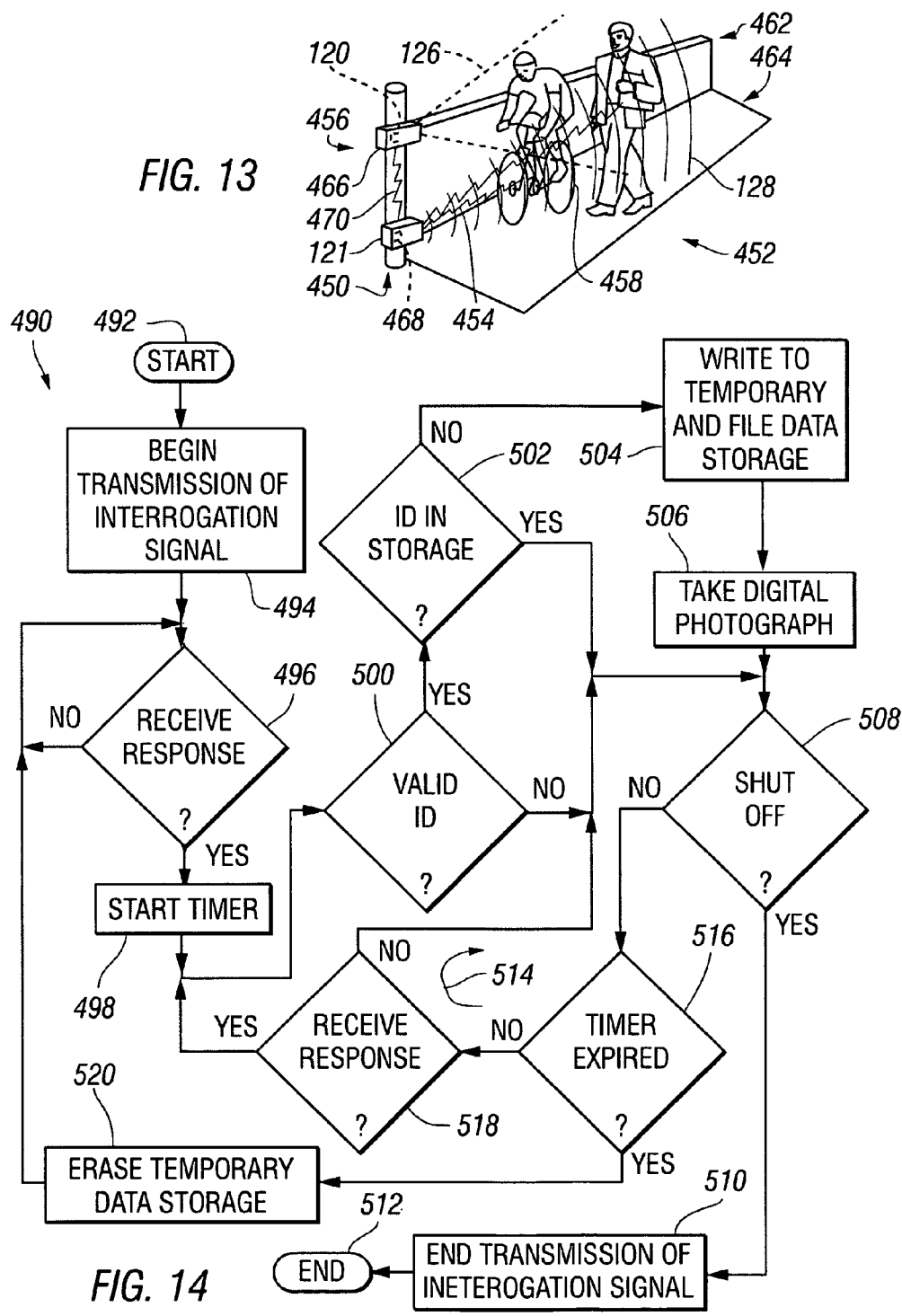
FIG. 13 is a perspective view of a version of the camera system within the system of FIG. 1, built in accordance with the second embodiment of the invention.
FIG. 14 is a flow chart of processes occurring during the execution of a first version of a routine within the camera system of FIG. 13 in accordance with the second embodiment of the invention.

FIG. 13 is a perspective view of a version 450 of the camera system 102, built in accordance with a second embodiment of the invention, taking a digital photograph of subjects 452 identified through the use of an RFID system 454. In accordance with the second embodiment, the interrogation signal 128 from the RFID interrogator 121 within the version 450 of the camera system 102 is constantly being transmitted, with a process of taking a digital photograph represented by digital data identifying one or more subjects 452 being begun when the RFID interrogator 121 receiving a response signal 454 from one or more RFID tags 122 attached to the subjects 452. The version 450 of the camera system 102 thus provides part of an automatic system 456 for taking digital photographs without the presence of a photographer, with such an automatic system 456 being particularly useful for lost or stolen objects. In the example of FIG. 13, the RFID tags 122 are hidden on or within a bicycle 458 and a laptop computer 460 both of which are objects that are frequently lost or stolen. Preferably, the camera system 450 is located at a university campus of other place where objects such as bicycles and laptop computers are likely to be stolen, adjacent to a location where structures 462 cause pedestrians to walk or ride bicycles along a relatively narrow path 464, with the interrogation signal 128 and the field of view 126 of the camera system 456 mutually covering a portion of the path 464, so that an object such as the bicycle 458 or the laptop computer 460 will be photographed, together with the person riding or carrying the object.

In the example of FIG. 13, the RFID interrogator 121 is packaged separately from the remaining portions of the camera system 450, which are packaged within a camera device 466. This arrangement can also be used in a system built in accordance with the first embodiment of the invention for use by a photographer, and a camera system 102, as described above in reference to FIG. 7, having a single package including the RFID interrogator 121. As shown in FIG. 13, the camera device 466 includes data storage 120 storing data files for individual digital photographs, while the RFID interrogator 121 includes temporary data storage 468 storing data used in controlling the RFID identification process. The camera device 466 and the RFID interrogator 121 are connected by a radio link 470, which is, for example, configured according to Bluetooth standards, for the transmission of data and control signals.

In accordance with the second embodiment of the invention, a person owning an object such as the bicycle 358 or the laptop computer 460 first obtains an RFID tag 122, saves a serial number corresponding to the subject identifier 130 of the RFID tag 122, and installs the RFID tag 122 in or on the object. Then, if the object becomes lost or stolen, the owner of the object contacts the image server subsystem 204 over the network 208, and, if the lost or stolen object has been carried or ridden past the camera unit, he receives one or more digital photographic images showing the object and the person carrying or riding it.

FIG. 14 is a flow chart of processes occurring within the camera system 450 in accordance with a first version of the second embodiment of the invention during the execution of a routine 490 therein, with a digital photograph being taken each time a response from an RFID tag 122 is received, with the response including a subject identifier 130 that is both new and valid. Only one digital photograph in response to an individual subject identifier 130 during an interval established by a timer, so that a person standing with the RFID tag 122 in the range of the RFID interrogator 121 will not cause thousands of digital photographs to be taken. On the other hand, the expiration of the timer allows a single RFID tag 122 to cause a number of digital photographs to be taken if the object holding the RFID tag 122 is carried past the camera system 450 a number of times.

When the camera system 450 is turned on, the routine 490 starts in step 492 and begins transmission of the interrogation signal 128 in step 494. While the interrogation signal 128 is transmitted continuously as long as the camera system is turned on, it may be a continuous radio-frequency signal, a periodic radio-frequency signal, or a radio-frequency signal that is modulated to include commands. Then, when it is determined in step 496 that a response from an RFID tag 122 is being received, a timer is started in step 498. Next, in step 540, a determination is made of whether the response received in step 496 includes a valid subject identifier 130. If it does, a further determination is made in step 542 of whether the subject identifier 130 has been stored in the temporary data storage 468, the subject identifier 130 is written both to temporary data storage 468 and to file data storage 130 in step 544, and a digital photograph is taken in step 546. Then, in step 548, a determination is made of whether a power switch (not shown), controlling the camera system 450 has been shut off, causing transmission of the interrogation signal 128 to end in step 548, with the routine 490 ending in step 512. (It is assumed that electrical power is maintained to allow a process to be completed, even after the power switch is shut off.) When it is determined in step 540 that the last response received does not include a valid subject identifier 130, or in step 542 that the subject identifier 130 of the last response is already stored within temporary data storage 468, the routine 490 proceeds to step 542 without taking a digital photograph.

If it is determined in step 548 that the power switch has not been shut off, the routine 490 enters a loop 514 to wait for a determination in step 516 that the timer started in step 498 has expired, or for a determination in step 518 that a new response from an RFID tag 122 has been received. When it is determined in step 516 that the timer has expired, the temporary data storage 468 is erased in step 520, so that the next response received from an RFID tag 122 having a subject identifier 130 previously stored within the temporary data storage 468 will cause another digital photograph to be taken. The routine 490 then returns to step 496 to wait to receive the next response from an RFID tag 122. When it is determined in step 518 that another response has been received, the routine 490 returns to step 500 to begin the determinations described above for the new response.

Figure 15:
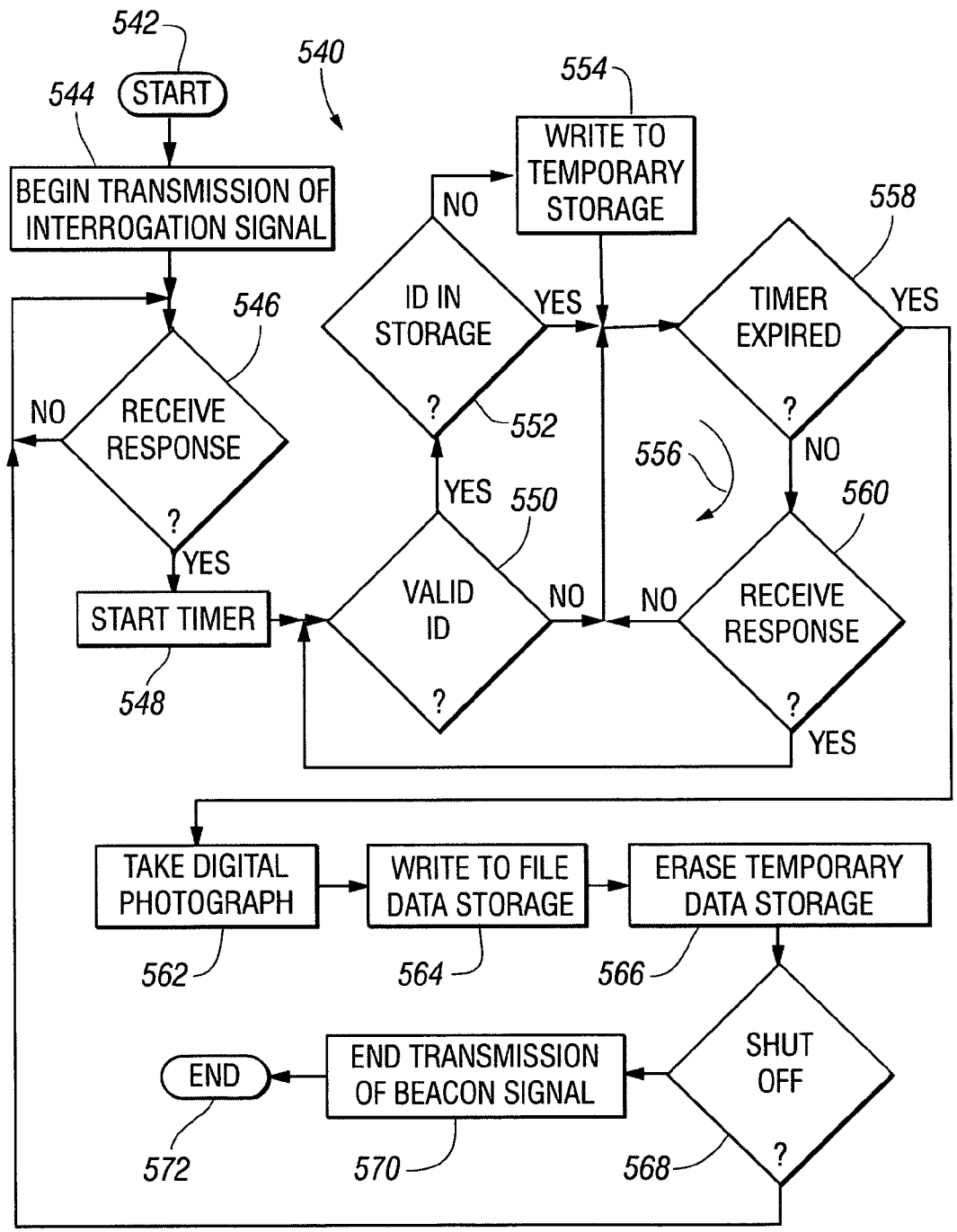
FIG. 15 is a flow chart of processes occurring during the execution of a second version of a routine within the camera system of FIG. 13 in accordance with the second embodiment of the invention.

FIG. 15 is a flow chart of processes occurring within the camera system 450 in accordance with a second version of the second embodiment of the invention during the execution of a routine 540 therein. In this version of the invention, a timer is used to establish a period of time when a individual digital photograph is taken, with as many different subject identifiers 130 from subjects within the digital photograph as possible being recorded within the metadata of the individual digital photograph.

When the camera system 450 is turned on, the routine 540 starts in step 542 and begins transmission of the interrogation signal 128 in step 544. While the interrogation signal 128 is transmitted continuously as long as the camera system is turned on, it may be a continuous radio-frequency signal, a periodic radio-frequency signal, or a radio-frequency signal that is modulated to include commands. Then, when it is determined in step 546 that a response from an RFID tag 122 is being received, a timer is started in step 548 to establish a time during which RFID responses will be considered, with the subject identifiers 130 associated with valid responses being stored within temporary data storage 468 before taking a digital photograph. Then, if it is determined in step 550 that a valid subject identifier 130 has been received, a further determination is made in step 552 of whether the subject identifier 130 has already been written to temporary data storage 468. If it has not, it is written to temporary data storage 468.

When it is determined in step 550 that the subject identifier 130 within the last response is not valid, or in step 552 that the subject identifier 130 has already been stored in temporary storage 468, or when the process of writing the subject identifier to storage has been completed in step 554, the routine 540 enters a loop 556 to determine, in step 558 when the timer started in step 548 has expired, or, in step 560, when a new response from an RFID tag 122 is being received. When it is determined in step 558 that the timer has expired, a digital photograph is taken in step 562, the data from temporary data storage 468 is written in step 564 to data file storage 120 to be a part of the metadata within the digital photograph, and the data in temporary data storage 468 is erased in step 566. Then, a determination is made in step 568 of whether a power switch (not shown) controlling the camera system 450 has been shut off, causing transmission of the interrogation signal 128 to end in step 570, with the routine 540 ending in step 572. (It is assumed that electrical power is maintained to allow a process to be completed, even after the power switch is shut off.) When it is determined in step 568 that the power switch has not been shut off, the routine 540 returns to step 546 to wait for a new response from an RFID tag 122.

While the invention has been described in terms of various embodiments and versions thereof with some degree of particularity, it is understood that this description has been given only by way of example, and that many variations may be made without departing from the spirit and scope of the invention, as defined within the appended claims.

What is claimed is:

1. A method for producing and distributing digital images, comprising:
 a) distributing a first plurality of RFID tags, each transmitting a different subject identifier in response to receiving an interrogation signal,
 b) arranging each of the RFID tags to be held with a subject;
 c) transmitting the interrogation signal from a camera system;
 d) receiving, within the camera system, a response including the different subject identifier from each RFID tag within a second plurality of RFID tags, wherein the second plurality is within the first plurality, and wherein a number of RFID responses in the second plurality is limited by expiration of a timer set in response to receiving the first response signal;

e) taking a digital photograph of a plurality of subjects, each holding an RFID tag within the second plurality;

f) recording data identifying each of the subject identifiers received in step d) within metadata stored with image data of the digital photograph taken in step e) as a data file;

g) repeating steps c) through f) a plurality of times to store a plurality of data files;

h) downloading the plurality of data files to an image server computer system, i) receiving, at the image server computer system, a request over a network from a client system for digital images of a subject identified by a subject identifier of an RFID tag within the first plurality held by the subject;

j) locating one or more data files including the subject identifier within the request received in step h); and k) transmitting the one or more data files located in step i) over the network to the client system.

2. The method of claim 1, wherein
transmission of the interrogation signal is begun by a photographer, and
the digital photograph is taken by the photographer.

3. The method of claim 2, wherein
a timer is started with beginning the transmission of the interrogation signal,
the transmission of the interrogation signal is ended with expiration of the timer,
an indicator light is illuminated only during the transmission of the interrogation signal.

4. The method of claim 1, wherein
the digital photograph is taken automatically in response to receiving a first response signal from an RFID tag within the first plurality.

5. The method of claim 1, wherein the metadata section includes an Exif section storing data identifying a type of camera used to produce the digital data file, and wherein the subject identifier is stored within the Exif section.

6. The method of claim 1, wherein the metadata section includes an Exif section storing data identifying a type of camera used to produce the digital data file, and wherein the subject identifier is stored and a location identified by a pointer stored within the Exif section.

7. A method for tracking a stolen article, comprising:
a) distributing a first plurality of RFID tags, each transmitting a different subject identifier in response to receiving an interrogation signal,
b) arranging each of the RFID tags to be held with a subject;
c) transmitting the interrogation signal from a camera system;
d) receiving, within the camera system, a response including a subject identifier from an RFID tag within the first plurality of RFID tags,
e) determining that the subject identifier received in step d) has not previously been stored in temporary data storage during a time established by a timer;
f) taking a digital photograph of a subject holding the RFID tag from which the response was received;
g) recording data identifying the subject identifier received in step d) within metadata stored with image data of the digital photograph taken in step f) as a data file;
h) repeating steps d) through g) a plurality of times to store a plurality of data files;
i) receiving a request over a network from a client system for digital images of the stolen article identified as a subject identified by a subject identifier of an RFID tag within the first plurality held by the subject;
j) locating one or more data files including the subject identifier within the request received in step i); and
k) transmitting the one or more data files located in step j) over the network to the client system.

8. The method of claim 7, additionally comprising:
starting a timer in response to receiving the response in step d);
receiving, within the camera system, in step d), an additional plurality of responses including different subject identifiers from RFID tags within the first plurality of RFID tags; and
recording, in step g), data identifying each of the different subject identifiers received with the additional plurality of responses in step d) within the metadata stored with image data of the digital photograph taken in stem e) within the data file.

9. The method of claim 7, wherein the metadata section includes an Exif section storing data identifying a type of camera used to produce the digital data file, and wherein the subject identifier is stored within the Exif section.

10. The method of claim 7, wherein the metadata section includes an Exif section storing data identifying a type of camera used to produce the digital data file, and wherein the subject identifier is stored and a location identified by a pointer stored within the Exif section.

11. A camera system comprising:
an image sensor producing an image data signal in response to being exposed to a pattern of illumination;
camera optics focusing an image of subjects within a field of view on the image sensor;
an RFID interrogator transmitting a radio-frequency interrogation signal, receiving a plurality of radio-frequency response signals including different subject identifiers from a plurality of RFID tags receiving the interrogation signal; and producing an output signal including the different subject identifiers;
a timer started in response to receiving a response signal from an RFID tag, wherein subject identifiers within response signals from RFID tags are accumulated during operation of the timer, and wherein a digital photograph is taken upon expiration of the timer, forming a data file having metadata including the accumulated subject identifiers;
a digital data generator receiving the image data signal from the image sensor and the output signal from the RFID interrogator and forming a digital data file including an image data section derived from the image data signal from the image sensor and a metadata section including the different subject identifiers derived from the output signal from the RFID interrogator; and
data file storage receiving and storing the image digital data file from the digital data generator.

12. The camera system of claim 11, wherein the metadata section includes an Exif section storing data identifying a type of camera used to produce the digital data file, and wherein the subject identifier is stored within the Exif section.

13. The camera system of claim 11, wherein the metadata section includes an Exif section storing data identifying a type of camera used to produce the digital data file, and wherein the subject identifier is stored and a location identified by a pointer stored within the Exif section.

14. The camera system of claim 11, wherein the RFID interrogator incorporates an anti-collision method providing for receiving clear response signals from a plurality of RFID tags.

15. The camera system of claim 11, additionally comprising a timer started in response to a manually actuated switch, wherein
- the manually actuated switch additionally start transmission of the interrogation signal, and
- transmission of the interrogation signal is ended upon expiration of the timer.

16. The camera system of claim 11, additionally comprising a timer started in response to receiving a response from an RFID tag, wherein a digital photograph is taken and in response to determining that a subject identifier within a response from an RFID tag has not been stored during operation of the timer.

17. The camera system of claim 11, wherein the RFID interrogator is packages separately from other components within the camera system, with the RFID interrogator being connected for data transmission to other components within the camera system by a radio link.

* * * * *